April 29, 1924.  
R. VARLEY  
1,492,340  
ELECTRICAL SYSTEM FOR SELF PROPELLED VEHICLES  
Filed Oct. 11, 1920 3 Sheets-Sheet 1

INVENTOR
Richard Varley
BY
ATTORNEY

April 29, 1924.

R. VARLEY 1,492,340

ELECTRICAL SYSTEM FOR SELF PROPELLED VEHICLES

Filed Oct. 11, 1920        3 Sheets-Sheet 2

INVENTOR
Richard Varley
BY
Rosenbaum, Stockbridge & Borst
ATTORNEY

April 29, 1924.
R. VARLEY
1,492,340
ELECTRICAL SYSTEM FOR SELF PROPELLED VEHICLES
Filed Oct. 11, 1920  3 Sheets-Sheet 3
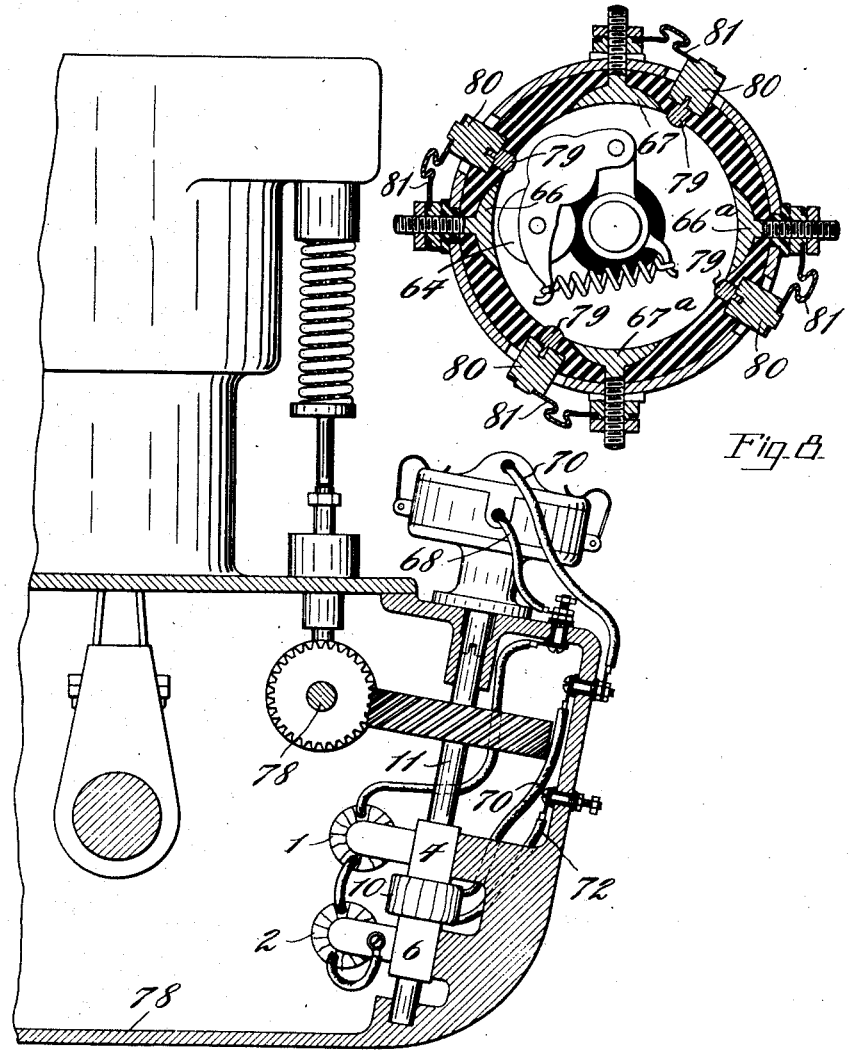
Fig. 8.
Fig. 7.
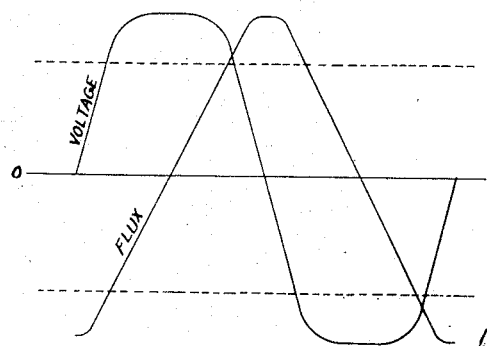
Fig. 9.
INVENTOR
Richard Varley
BY
ATTORNEY Patented Apr. 29, 1924.

1,492,340

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

ELECTRICAL SYSTEM FOR SELF-PROPELLED VEHICLES.

Application filed October 11, 1920. Serial No. 416,215.

*To all whom it may concern:*

Be it known that I, RICHARD VARLEY, a citizen of the United States, residing at Englewood, in the county of Bergen and State of New Jersey, have invented certain new and useful Improvements in Electrical Systems for Self-Propelled Vehicles, of which the following is a full, clear, and exact description.

My invention relates to electrical systems and particularly those designed for use in self-propelled vehicles, such as automobiles, motor boats and the like. Objects of my invention are simplicity of design, economy and reliability of operation, and cheapness of construction and maintenance.

My invention comprehends an A. C. system which obviates many of the limitations inherent in the D. C. systems in common use in automobiles and the like. Lubrication is greatly facilitated, the voltage regulation is superior to that of a D. C. machine, and there are many other advantages manifest to one skilled in the art from the description given below of a specific embodiment of my invention.

One of the features of my invention is the combination of suitable automatic switching mechanism with an A. C. generator by means of which the battery is charged with the A. C. current generated by the generator, the switch being driven in timed relation to the rotor of the armature and the contacts being proportioned and arranged to take the current only when the voltage exceeds that of the battery. A satisfactory generator for this purpose is an inductor generator of the type described and claimed in my co-pending application, Serial Number 416,216, filed October 11, 1920, the inductor and poles of which are proportioned so that there is a uniform change in the flux for a substantial angular movement of the rotor. In a generator of this type the desired result is effected by making the inductor faces substantially 90° and the pole faces substantially 60°. In this way the flux is given a uniform change for a relatively long time, the effect being to give a constant maximum voltage for a long time.

A very satisfactory type of switch for this purpose is one constructed like the usual commutator of D. C. machines and having certain groups of segments electrically connected, the brushes being properly spaced and connected to the armature windings and to the battery to effect the desired result. Other types of switch may, however, be used for this purpose, for example, one of the roller timer type, although I have found the commutator type to be the most economical.

A suitable centrifugal contact is employed to close the battery charging circuit when the generated voltage is sufficiently high, and this contact will preferably be embodied in the rotary switch, although it is manifest that it may be arranged independently of the switch, in which case it may serve to automatically control the connection between the battery and the ignition.

The switch may be so constructed and connected to the armature leads and to the battery as to operate as a pole changer and send the current impulses of both signs through all the cells of the battery, or the battery may be divided into two equal sections by providing a central connection and connecting one terminal of the armature winding to the central battery connection and the two end terminals of the battery to brushes, the other terminal of the armature winding being alternately electrically connected to the two brushes through the medium of the rotary switch in synchronism with the current alternations, whereby the current impulses of one sign are put through one battery section in the proper direction, and those of the other sign are put through the other battery section in the proper direction. The latter method is convenient for charging a battery with an even number of cells.

My system also comprehends the utilization of most of the generated voltage and current for the high candle power headlights. For this purpose I make provision for connecting the said lights directly across the armature winding.

My invention also comprehends means suitably combined with the other elements of my invention for arresting sparking at the contacts of the rotative switch and other features and arrangements and combinations of the parts as will hereinafter more fully appear.

I shall now describe the illustrated embodiments of my invention and shall thereafter point out my invention in claims.

Fig. 7 is a transverse section through the crank casing of the engine showing the location of the generator and its connections;

Fig. 8 is an enlarged sectional detail of the type of switch illustrated in Figures 5 and 6, showing one form of spark arresting means; and Fig. 9 is a diagram showing the voltage and flux curves of the generator.

The illustrated generator comprises two electro-magnets 1 and 2 provided with poles 3, 4 and 5, 6 respectively of sufficient mass to conduct the sum of the fluxes of both magnets, the like poles being connected by yokes or cores 7 and 8 of somewhat smaller cross-section since they are never called upon to conduct the combined flux. The armature or induced windings 9 and 10 are disposed on these connecting yokes and are connected in series or parallel as desired. The diagrams show the armature windings connected in series.

Figures 2, 3:
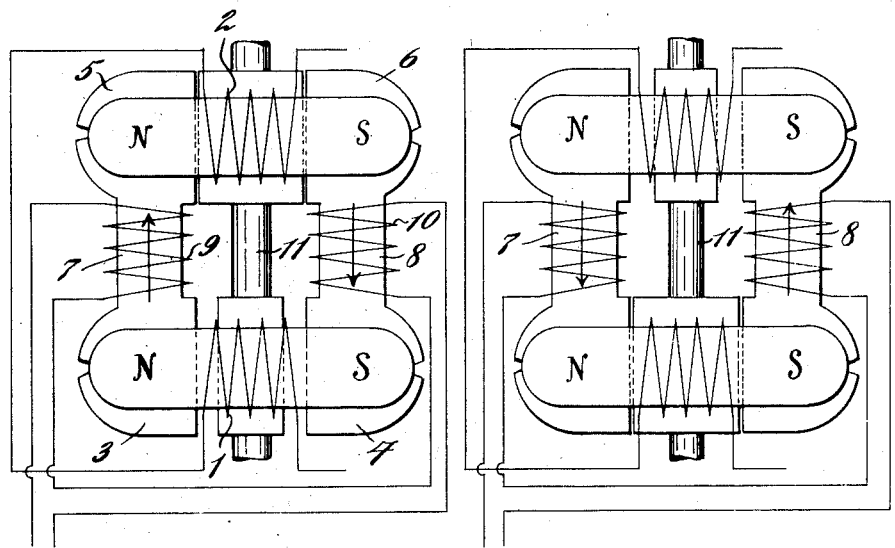
Figs. 2 and 3 are diagrams of the electrical and magnetic circuits of the generator in the two positions of the inductor.

The rotor shaft 11, which has a suitable driving connection with the prime mover, carries two inductors 12 and 13 arranged at right angles to each other, but they may be otherwise disposed. They are adapted to alternately bridge the poles 3, 4 and the poles 5, 6. The direction of the flux in the two positions of the rotor is indicated by the arrows in Figs. 2 and 3. When the poles 5, 6 are bridged it will be seen that the flux of magnet 1 traverses the armature windings in one direction while the flux path of the magnet 2 is short circuited, and when the poles 3, 4 are bridged the flux of magnet 2 traverses the armature windings in the opposite direction while the flux path of the magnet 1 is short circuited.

To insure that the flux shall traverse the armature windings as above stated, the total flux furnished by each magnet is limited in amount to practically one-half of that passing through that inductor, which bridges the poles 3 and 4 or 5 and 6.

The voltage is kept approximately constant at its maximum for an appreciable period during each reversal by reason of the fact that the pole faces are substantially 60° in length while the inductor faces are substantially 90°. The resultant voltage and flux waves are illustrated in Fig. 9, from which it will be seen that there is uniform change in the flux for about 30°, and that there is a corresponding uniformity in the voltage at its maximum value, where it remains substantially constant for about 30°.

Figure 1:
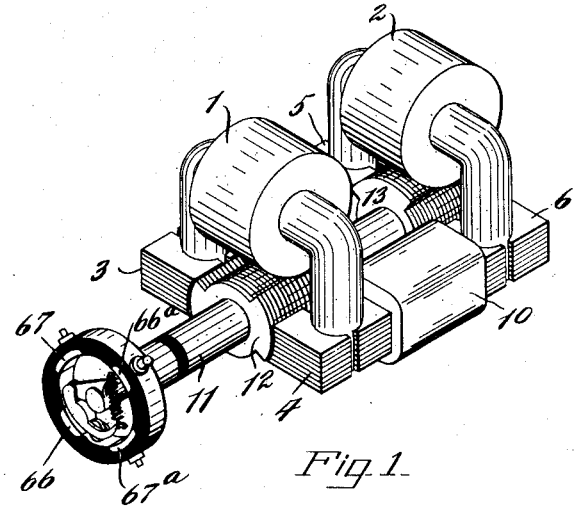
Fig. 1 is a perspective of one form of generator and co-operative switch embodying my invention.
Figure 4:
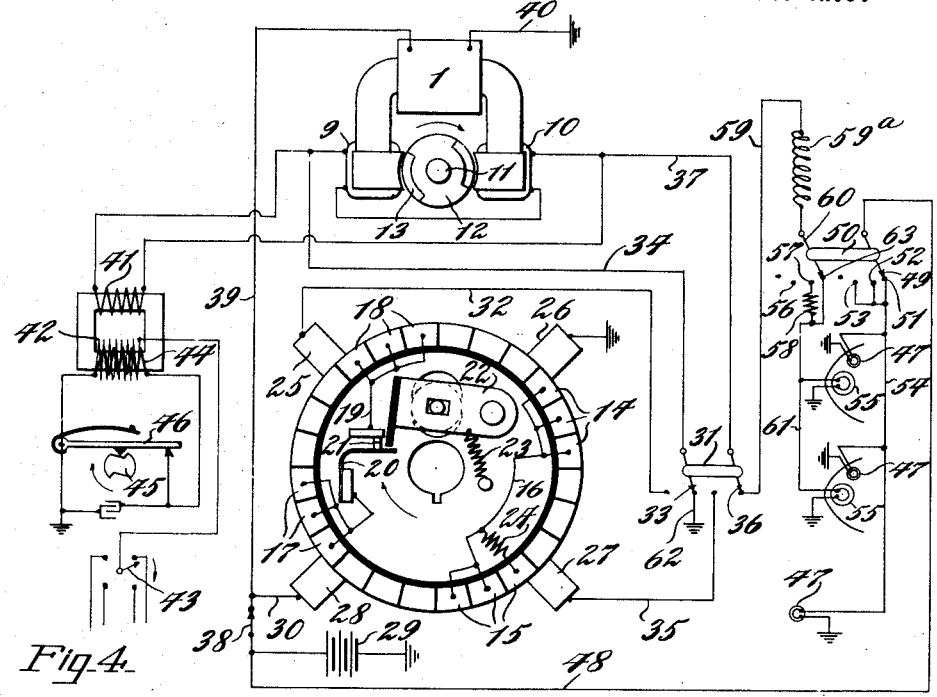
Fig. 4 is a diagram of the complete electrical system.

The rotary switch for taking off the current for charging the battery during these periods of voltage dwell is preferably mounted on the rotor shaft 11. In Fig. 1 I have shown one type of switch for this purpose, which is of the roller timer type, while in Fig. 4 I have shown diagrammatically a switch of what I term the commutator type. The switch shown in Fig. 4 is composed of the usual commutator segments, there being four groups about 90° apart, each comprising three segments electrically connected. The two groups 14 and 15 in one half of the commutator member are electrically connected by the wire 16, and the two groups 17 and 18 in the other half of the member are also arranged to be electrically connected through the wire 19 and spring 20 which controls the contacts 21. A pivoted weighted member 22 is arranged under the influence of spring 23 and bears against the end of spring 20 and opens the contacts 21, and under centrifugal force when the switch is being rotated the weighted member 22 will swing outwardly against the tension of spring 23 and permit contacts 21 to close as shown in Fig. 4. The trailing segment of group 15 is connected to the wire 16 through a resistance 24 which serves to absorb the spark as the contacts break, as will be hereinafter described.

Four brushes 25, 26, 27 and 28, are disposed 90° apart and arranged to wipe the commutator member. The contact 26 is grounded, and the battery 29 has one of its terminals grounded and the other terminal connected to brush 28 through lead 30; the brushes 25 and 27 are arranged to be connected to opposite terminals of the induced windings 9 and 10 when the two-pole switch 31 is moved to the left from the position shown in Fig. 4. Under that condition the brush 25 is connected to the terminal of the induced winding 9 through wire 32, contact 33 of switch 31 and wire 34, and brush 27 is connected to the terminal of induced winding 10 through the wire 35, contact 36 of switch 31, and wire 37.

It will now be seen that, with switch 31 to the left or in charging position, and with brushes 25, 26, 27 and 28 on segmental groups 18, 14, 15 and 17, respectively, the left side of the battery will be connected to the terminal of induced coil 9, while the grounded side of the battery will be connected to the terminal of the induced coil 10 through the following circuit: wire 34, contact 33, wire 32, and brush 25, segmental group 18, wire 19, contacts 21, spring 20, segmental group 17, brush 28, wire 30, battery 29 to ground, thence brush 26, segmental group 14, wire 16, segmental group 15, brush 27, wire 35, contact 36 and wire 37. When the switch is rotated 90°, at which time the current has reversed, the connection to the battery is reversed as follows: wire 37, contact 36, wire 35, brush 27, segmental group 14, wire 16, segmental group 15, brush 28, wire 30, battery 29 to ground, thence brush 26, segmental group 18, wire 19, contacts 21, spring 20, segmental group 17, brush 25, wire 32, contact 33 and wire 34. In this way current impulses of both signs are delivered to the battery in the proper direction for charging. A switch 38 may be arranged in this charging circuit.

To energize the magnet windings they are connected on one side to one terminal of the battery through the shunt connection 39 and are connected on the other side to ground through the wire 40. It will be understood that the magnets may be permanent magnets in which case the shunt circuit just described will be employed only for the purpose of re-magnetizing the magnets.

At the left of the diagram in Fig. 4 is shown a suitable A. C. ignition circuit in which a transformer is employed. The primary 41 of the transformer is connected across the terminals of the induced windings of the generator, while the secondary 42 leads to the distributor 43. A choke coil 44 is also co-ordinated with the secondary 42 and is arranged to have its circuit intermittently opened and closed through the breaker cam 45 which controls the lever 46 of the breaker contact. This A. C. ignition system corresponds to that patented in my prior Patent No. 1,081,413, issued Dec. 16, 1913.

It is a well known fact that the aggregate ampere hour requirements of the large headlights in the lighting system of an automobile is relatively very large as compared with both the requirements for ignition and for starting. In my system I have accordingly made arrangements for supplying current to the big headlights directly from the generator, as well as the current for the ignition, while the current for the small lights and tail light is supplied from the battery through the following circuit: from the live side of battery 29 through wire 48, contact 49 of switch 50, thence to either one of the three contacts 51, 52 or 53, thence to wire 54 through the small head light and tail light 47 to ground. The large headlights 55 are arranged to be connected directly across the terminals of the induced windings and this connection is controlled by the switch 50. When the switch 50 is in its position farthest to the left, both of the circuits for the large and the small headlights are open. When the switch is moved to the first position to the right on the contacts 56 and 53, the small headlights are on while the large headlights are off. When the switch 50 is moved to the next position to the right on the contacts 57 and 52, the small headlights are on and the circuit for the large headlights is closed through the resistance 58, as follows, the switch 31 at that time being in its position to the right as shown in Fig. 4: wire 37, contact 36, wire 59, impedance coil 59ª, lever 60 of switch 50, contact 57, resistance 58 and wire 61 through the big lamps 55 to ground, thence through wire 62, contact 33 and wire 34 back to the other side of the induced windings.

When it is desired to illuminate the big headlights to their fullest brilliancy, the switch 50 is moved to its position farthest to the right, at which time the lever 60 engages contact 63 and the circuit through the lamps 55 is as above traced with the omission of the resistance 58, but through the impedance coil 59ª, as before.

It will be observed that the resistance 24 will always serve to absorb the spark as the contacts between the brushes and the segmental groups of the switch are broken in any charging position of the parts. The commutator member rotates clockwise, as indicated by the arrow, and the trailing segment of group 15 to which the resistance 24 is connected will always be included in the circuit at the end of each charging impulse. The width of the brushes will preferably be substantially that of the commutator segments, with the result that the two leading segments of each group will engage the brush for an angular distance equal substantially to the width of three commutator segments, which will be for a period sufficient to take off the current at that portion of the peak represented as outside the dotted lines in Fig. 9. Throughout the period for each charging impulse during which the brushes are in engagement with the third or trailing segment of the respective group with which the brushes are contacting, it will be observed that the resistance 24 will always be in the circuit and will therefore absorb the spark as contact between the brushes and their respective segmental groups is broken.

Figures 5, 6:
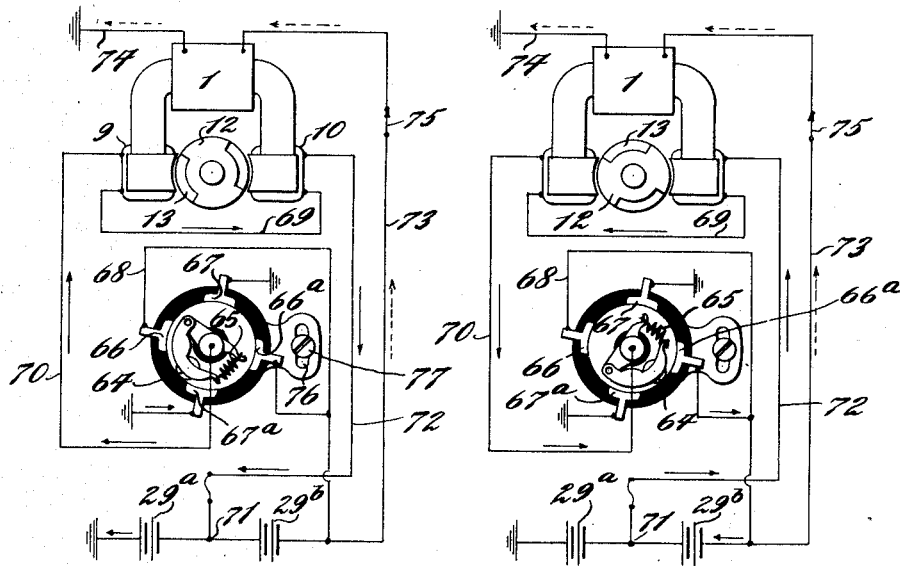
Figs. 5 and 6 are diagrams of the charging system and a modified form of switch showing the two positions of the parts during the negative and positive current impulses.

In the diagrams of Figs. 5 and 6 is shown a roller timer type of switch of the character shown in Fig. 1. The roller contact 64 is carried by a weighted or centrifugal arm retracted by a spring 65, the tension of which is adjusted to restrain the centrifugal action until a predetermined engine speed has been attained. Co-operative with the rotative contact 64 are four stationary contacts 66, 66ª and 67, 67ª, the first two being connected in multiple by the wire 68 to one side of the battery, which for charging purposes may be considered as two cell sections 29ᵃ and 29ᵇ. The other two stationary contacts 67 and 67ᵃ are grounded, as is the other terminal of the battery.

The switch contacts and the inductors are so relatively arranged, and the stationary contacts are of such length, that the centrifugal contact engages the four stationary contacts during each half cycle throughout the angular periods when the voltage is at its peak, which will be approximately that portion of the curves in Fig. 9 outside of the dotted lines.

The armature coils 9 and 10 are shown connected in series by the wire 69, while the other terminal of the coil 9 is shown connected to the roller contact 64 by the wire 70, and the other terminal of the coil 10 is shown connected to an intermediate connection 71 of the battery by a wire 72.

It will now be seen that when the roller contact 64 is on the contacts 67 and 67ᵃ, the current wave of one sign will flow through the battery section 29ᵃ as indicated by the arrows in Fig. 5, and that when the roller contact 64 is on contacts 66 and 66ᵃ the current wave of opposite sign will flow through the battery section 29ᵇ, as indicated by the arrows in Fig. 6. The magnet windings are connected in shunt to the battery for purposes of energization through the wires 73, and 74, this shunt circuit being controlled by a switch 75, but if the magnets are of the permanent type, they are kept charged by occasional connections to the battery through switch 75.

For the purpose of affording angular adjustment between the stationary contacts and the centrifugal rotative contact, the support for the stationary contacts is shown as provided with a slot 76 in which the supporting screw 77 engages. By letting up on the screw 77, the outer member carrying the stationary contacts is released for angular adjustment relative to the rotative contact, not only to initially obtain the proper relation of the contacts to the alternations of the current, but also to compensate for wear of the parts.

In Fig. 7 is shown a convenient mounting and connection for the generator and switch member. In this arrangement the generator is mounted inside of the crank case of the engine, and is shown as mounted on bosses or bearing members cast on the inner face of the crank case 78 of the engine, and it is manifest that the parts will therefore run in oil. The rotor shaft 11 may be operatively connected to the cam shaft 78 through the worm and worm wheel drive illustrated. The switch is arranged externally of the crank case and may be readily removed for adjustment or replacement independently of the generator.

In this roller timer type of switch the spark arresting members may be of the type illustrated in Fig. 8. A suitable contact point 79 of tungsten or other good contact metal which is highly resistant to heat, is arranged immediately after each one of the stationary contacts and is carried by a suitable conductive member 80 disposed radially in a slot in the casing and connected to the respective stationary contact through resistance members 81, which are also retractile spring members and which are resilient and serve to resiliently hold their contact points in their innermost radial position.

It is obvious that various modifications may be made in the construction shown in the drawings and above particularly described within the principle and scope of my invention.

I claim:

1. An inductor generator comprising two magnets each having complementary poles of sufficient capacity to conduct the combined flux of both magnets, flux conductors joining the like poles of the two magnets, an induced winding on one of the flux conductors, a rotor having two inductors arranged to alternately magnetically bridge the poles of the two magnets, a storage battery, stationary contacts connected to opposite sides of the battery, and a switch rotative with the rotor and including contacts having electrical connection with the induced winding and operative to reverse the connections between the induced winding and storage battery in synchronism with the alternations of the generated current, the stationary and rotative contacts being proportioned and related to be engaged for less than 90 angular degrees and during the period of maximum voltage.

2. An inductor generator comprising two magnets each having complementary poles of sufficient capacity to conduct the combined flux of both magnets, the pole faces being substantially 60° in length, flux conductors joining the like poles of the two magnets, an induced winding on one of the flux conductors, a rotor including a shaft and two inductors disposed thereon at substantially right angles and arranged to magnetically bridge the poles of the respective magnets, the inductor faces being substantially 90° in length, a storage battery, stationary contacts connected to opposite sides of the battery, and a switch rotative with the rotor and including contacts having electrical connection with the induced winding and operative to reverse the connections between the induced winding and storage battery in synchronism with the alternations of the generated current, the stationary contacts and the contacts of said switch being proportioned and related to be engaged for substantially the 45 angular degrees of maximum voltage.

3. An inductor generator comprising two magnets each having complementary poles of sufficient capacity to conduct the combined flux of both magents, flux conductors joining the like poles of the two magnets, an induced winding on one of the flux conductors, a rotor having two inductors arranged to alternately magnetically bridge the poles of the two magnets, a storage battery, a switch rotative with the rotor and including two contacts spaced substantially 90 degrees, two stationary contacts spaced substantially 90 degrees and positioned to be successively engaged by the rotary contacts and proportioned to be engaged thereby for substantially 45 degrees movement of the rotor during the period of maximum voltage, one stationary contact being electrically connected to one side of the battery and the other with the other side of the battery, and means for electrically connecting one rotary contact with one end of the induced winding and the other with the other end of the induced winding.

4. The combination of an inductor generator comprising two magnets each having complementary poles of sufficient capacity to conduct the combined flux of both magnets, flux conductors joining the like poles of the two magnets, an induced winding on one of the flux conductors, a rotor having two inductors arranged to alternately magnetically bridge the poles of the two magnets, a storage battery, a commutator rotative with the rotor and having two segmental portions of substantially 45 degrees electrically continuous, means including a centrifugal switch for conductively connecting the two segments, and two stationary brushes wiping the commutator and spaced 180 degrees apart, one brush being connected to one terminal of the battery and the other brush to the other terminal of the battery.

5. An electrical system for vehicles comprising an induction generator including two electro-magnets, flux conductors joining the like poles of the two magnets, an induced winding on one of the flux conductors, and a rotor having two inductors arranged to alternately magnetically bridge the poles of the two magnets, a storage battery, connections between the battery and induced winding including a rectifying switch driven in timed relation to the rotor of the generator, and a work circuit including a switch and arranged to be connected directly across the induced winding.

6. An electrical system for vehicles comprising an induction generator including two electro-magnets, flux conductors joining the like poles of the two magnets, an induced winding on one of the flux conductors, and a rotor having two inductors arranged to alternately magnetically bridge the poles of the two magnets, a storage battery, connections between the battery and induced winding including a rectifying switch driven in timed relation to the rotor of the generator, a work circuit including a switch and arranged to be connected directly across the induced winding, and means for connecting the magnet windings in circuit with the battery for energizing the magnets.

In witness whereof, I hereunto subscribe my signature.

RICHARD VARLEY.